United States Patent
Chien et al.

(10) Patent No.: US 7,873,498 B2
(45) Date of Patent: Jan. 18, 2011

(54) REMOTE HARDWARE INSPECTION SYSTEM AND METHOD

(75) Inventors: Wei-Yu Chien, Taipei County (TW); Ko-Chin Chung, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 102 days.

(21) Appl. No.: 12/385,609

(22) Filed: Apr. 14, 2009

(65) Prior Publication Data

US 2010/0180157 A1    Jul. 15, 2010

(30) Foreign Application Priority Data

Jan. 13, 2009   (TW) .............................. 98101061 A

(51) Int. Cl.
  *G06F 11/07*   (2006.01)
(52) U.S. Cl. ..................... 702/188; 714/25; 714/37; 714/38; 709/205; 717/124; 717/126
(58) Field of Classification Search ................. 702/188; 714/33, 38, 37; 709/205, 227; 717/124, 717/125, 126, 127, 131, 132, 155, 101
  See application file for complete search history.

(56) References Cited

U.S. PATENT DOCUMENTS

| | | | | |
|---|---|---|---|---|
| 5,630,049 A | * | 5/1997 | Cardoza et al. ............... | 714/25 |
| 5,675,800 A | * | 10/1997 | Fisher et al. .................. | 713/2 |
| 6,421,777 B1 | * | 7/2002 | Pierre-Louis et al. .......... | 713/2 |
| 6,560,648 B1 | * | 5/2003 | Dunn et al. .................. | 709/224 |
| 6,993,748 B2 | * | 1/2006 | Schaefer ...................... | 717/124 |
| 7,516,180 B2 | * | 4/2009 | Lacy .......................... | 709/205 |
| 2009/0098867 A1 | * | 4/2009 | Varanda ...................... | 455/423 |
| 2009/0268878 A1 | * | 10/2009 | Walters et al. ........... | 379/27.01 |

* cited by examiner

*Primary Examiner*—Carol S Tsai
(74) *Attorney, Agent, or Firm*—Thomas, Kayden, Horstemeyer & Risley, LLP

(57) ABSTRACT

The invention discloses a remote hardware inspection system, including a remote monitor station and a client server. The monitor station includes a hardware inspection unit and a first network interface. The hardware inspection unit is for generating a hardware inspection command which is transmitted to the server by the first network interface. The server includes a second network interface, an input/output unit, and a managing/controlling unit. The input/output unit has an inspection program. The second network interface receives the hardware inspection command and transmits it to the managing/controlling unit. In response to the hardware inspection command, the managing/controlling unit generates and transmits a trigger signal to the input/output unit to implement the inspection program. Thereby, the inspection program writes data into the target hardware of the server according to the content of the hardware inspection command.

12 Claims, 5 Drawing Sheets

REMOTE HARDWARE INSPECTION SYSTEM AND METHOD

BACKGROUND OF THE INVENTION

1. Field of the Invention

The present invention relates generally to a remote hardware inspection system and method, and more particularly, to a remote hardware inspection system and method for a client server.

2. Description of the Prior Art

Nowadays, many industries apply a PC/server system to manage and operate office works. The PC/server system is used to integrate resources of software and hardware in a network for giving more effective and safer service, for example, accessing/copying files, network support, and sharing various resources with other servers. Generally, the server is kept running all the time for giving service automatically and continuously.

Traditionally, when PC/server systems break down, they are always inspected by the program which is built in the server of the system. In addition to signal inspection, they are usually inspected by complex inputting/outputting data or reading data of a memory or a hardware register, and the data is cross-over analyzed and compared by the built-in programs to get an inspection result. However, some serious events can not be inspected by the program. For example, when the operation system (OS) of the server crashes (e.g. so-called "blue screen of death") or the server breaks down in the booting process, the server needs to be inspected by a special external hardware inspection apparatus.

As shown in FIG. 1, an external hardware inspection apparatus 12 needs to be connected with a server 10 and a monitor station 14, and then the hardware inspection apparatus 12 transmits the inspection result from the server 10 to the monitor station 14, so that developers and engineers can analyze the inspection result to understand current hardware status of the server.

However, this kind of external hardware inspection apparatuses, for example, Intel XDP or AMD HDT, are very expensive. In order to reduce the development cost, the interface of the external hardware inspection apparatuses for connection with the motherboard is developed and determined just before the mass production stage of the motherboard. Thus, the interfaces always have some problems in compatibility, which troubles many developers and engineers.

Accordingly, the present invention is to provide a remote hardware inspection system and method for solving the aforementioned problems.

SUMMARY OF THE INVENTION

An aspect of the invention is to provide a remote hardware inspection system.

According to one embodiment of the invention, the remote hardware inspection system includes a remote monitor station and a client server. Therein the remote monitor station includes a hardware inspection unit and a first network interface, and the client server includes an input/output unit, a managing/controlling unit, and a second network interface.

The remote hardware inspection unit of the remote monitor station is coupled to the first network interface, generates and transmits a hardware inspection command to the first network interface. Furthermore, the first network interface transmits the hardware inspection command through a network.

The input/output unit of the client server is coupled to the managing/controlling unit and it has an inspection program. The second network interface is coupled to the managing/controlling unit and receives the hardware inspection command of the hardware inspection unit from the remote monitor station through the network.

The hardware inspection command receives and transmits the hardware inspection command to the managing/controlling unit. In responding to the hardware inspection command, the managing/controlling unit generates and transmits a trigger signal to the input/output unit for executing the inspection program. Thereby the inspection program inspects the target hardware of the client sever according to the content of the hardware inspection command.

In one embodiment, the hardware inspection command is a data reading command and the inspection program accesses hardware information of the target hardware according to the content of the data reading command. Subsequently, the hardware information is transmitted from the input/output unit through the managing/controlling unit to the second network interface and then transmitted from the second network interface to the remote monitor station for being determined by the hardware inspection unit.

In another embodiment of the invention, the hardware inspection command is a data writing command. The inspection program writes data into the target hardware according to the content of the data writing command.

Another embodiment of the invention is to provide a method for inspecting a remote hardware including the steps of:

(a) generating a hardware inspection command by a remote monitor station;

(b) transmitting the hardware inspection command to a client server through a network;

(c) in response to the hardware inspection command, executing a inspection program of the client server; and (d) inspecting a target hardware of the client server according to the content of the hardware inspection command.

In one embodiment, the hardware inspection command is a data reading command and the step (d) includes the steps of:

(d1) accessing the hardware information of the target hardware according to the content of the data reading command; and (d2) transmitting the hardware information from the client server to the remote monitor station for analysis.

In another embodiment, the hardware inspection command is a data writing command and the step (d) is performed to write data into the target hardware according to the content of the data writing command.

Compared with prior art, hardware inspection is done by the input/output unit and the managing/controlling unit of the client server of the invention. Additionally, the hardware inspection command and the network interface of the invention replace a conventional external hardware apparatus. As for the function, the managing/controlling unit can start the input/output unit for complex inputting/outputting or reading data stored in a memory or a hardware register, and the data is transmitted by the managing/controlling unit to a network interface for packaging. The packaged data is transmitted to the remote monitor station for analyzing and comparing.

By doing so, if the OS of the client server crashes (e.g. so-called "blue screen of death") or the server breaks down in the booting process, the developer or engineer can remotely inspect hardware at any time or inspect several severs at the same time without any external hardware inspection apparatus. Accordingly, the development cost of motherboards can be reduced, and the spending time on solving problems can be saved.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
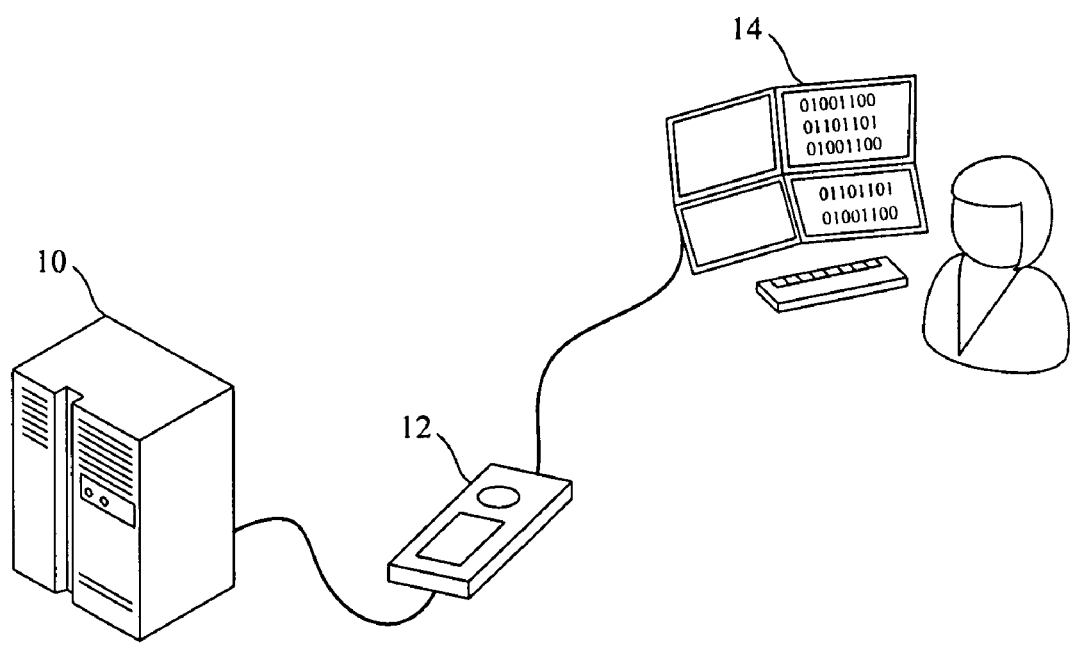
FIG. 1 is a schematic diagram illustrating a conventional hardware inspection system.
Figure 2A:
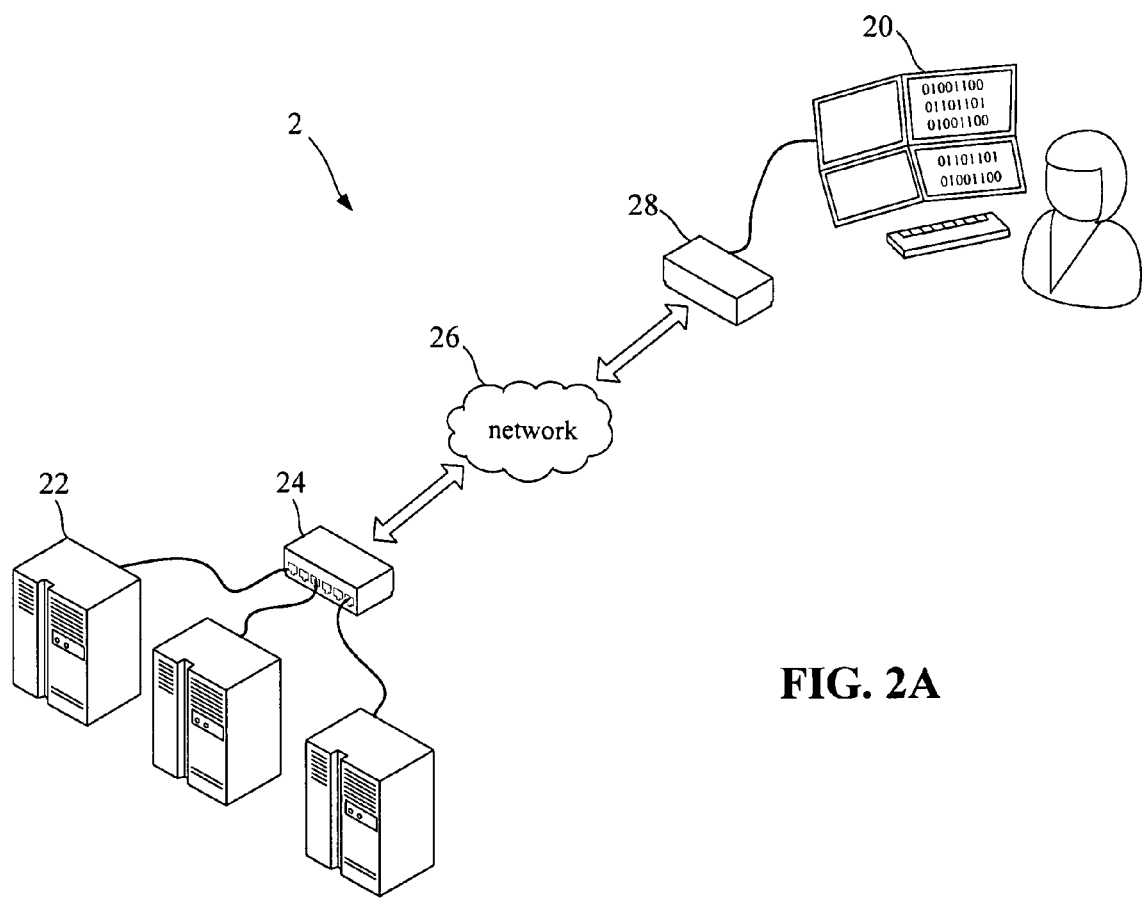
FIG. 2A is a schematic diagram illustrating a remote hardware inspection system according to one embodiment of the invention.
Figure 2B:
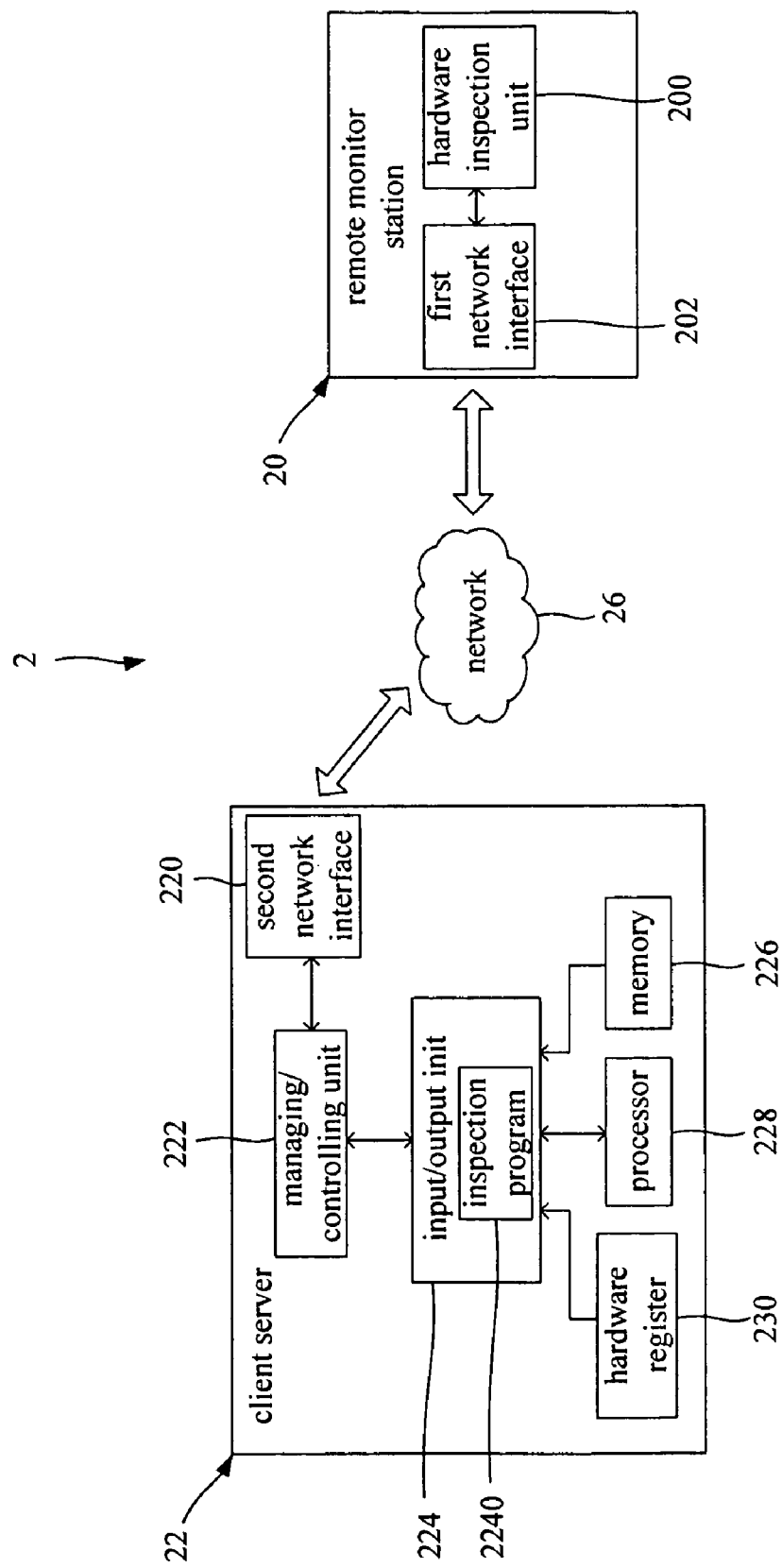
FIG. 2B is a function block diagram of a remote hardware inspection system according to one embodiment of the invention.

Please refer to FIG. 2A and FIG. 2B. FIG. 2A is a schematic diagram illustrating a remote hardware inspection system 2 according to one embodiment of the invention. FIG. 2B is a function block diagram of a remote hardware inspection system 2 according to one embodiment of the invention.

As shown in FIG. 2A, the remote hardware inspection system 2 of the invention includes a remote monitor station 20, a client server 22, and network apparatuses 24, 28. The amount of the client server could be one or more, and the server 22 is coupled to the network apparatus 24 for linking to a network 26. Similarly, the remote monitor station 20 is coupled to the network apparatus 28, so that the client server 22 and the remote monitor station 20 can transmit data to each other through the network 26. Additionally, in practical application, the client server 22 and the remote monitor station 20 communicate with each other through Ethernet. Moreover, a remote management control protocol (PMCP) is implemented over the network 26.

As shown in FIG. 2B, the remote monitor station 20 includes a hardware inspection unit 200 and a first network interface 202. The client server 22 includes an input/output (I/O) unit 224, a managing/controlling unit 222, a second network interface 220, and hardware components such as a memory 226, a CPU 228, and a hardware register 230. The managing/controlling unit 222 could be a baseboard management controller (BMC) of a server. Particularly, the input/output unit 224 has an inspection program 2240. In the invention, the inspection program 2240 is a system management interrupt (SMI) service program for handling hardware inspection requests.

The hardware inspection unit 200 of the remote monitor station 20 is coupled to the first network interface 202; the input/output unit 224 of the client server 22 is coupled to the managing/controlling unit 222; and the second network interface 220 is coupled to the managing/controlling unit 222. Additionally, the memory 226, the CPU 228, and the hardware register 230 are coupled to the input/output unit 224. In practice application, the input/output unit 224 and the managing/controlling unit 222 of the server communicate with each other through an intelligent platform management interface (IPMI).

When the OS of the client server 22 crashes (e.g. so-called "blue screen of death") or the server breaks down in the booting process, the client notifies the developers or engineers stationing near the remote monitor station 20. Then, the developer or engineer inputs particular inspection instruction to the remote monitor station 20 so that the hardware inspection unit 200 generates a hardware inspection command.

Subsequently, the hardware inspection unit 200 transmits a hardware inspection command to the first network interface 202, and then the first network interface 202 transmits the hardware inspection command to the client server 22 through a network.

The second network interface 220 receives the hardware inspection command of the hardware inspection unit 200 from the remote monitor station 20 through the network. After the second network interface 220 receives the hardware inspection command, the hardware inspection command is transmitted to the managing/controlling unit 222. In response to the hardware inspection command, the managing/controlling unit 222 transmits a trigger signal to the input/output unit 224, and the input/output unit 224 is triggered to generate and transmit a SMI to the server. Therefore, CPU of the server executes the SMI service program of the input/output unit 224 to inspect the target hardware of the client server 22 according to the content of the hardware inspection command. It should be noticed that the hardware inspection command could be a data reading command or a data writing command.

When the hardware inspection command is a data reading command, the inspection program 2240 of the input/output unit 224 is executed to access the hardware information of the target hardware according to the content of the data reading command.

For example, the data reading command is used to read data of PCI configuration space, system memory space, system IO space, ISA IO Index/Data port, SMBus device, CPU MSR, CPU machine check error, IDE identity, and so on.

After the hardware information is retrieved, the hardware information is transmitted from the input/output unit 224 through the managing/controlling unit 222 to the second network interface 220. Then, the second network interface 220 compresses and packages the hardware information, and transmits it to the remote monitor station 20 for analyzing and comparing.

In another embodiment, the hardware inspection command is a data reading command. The inspection program 2240 writes data into the target hardware according to the content of the data writing command. By writing data into the target hardware, the operation status of the target hardware can be inspected or the programs can be debugged.

For example, the data writing command is used to write data into system memory space, system IO space, and CPU MSR.

Figure 3A:
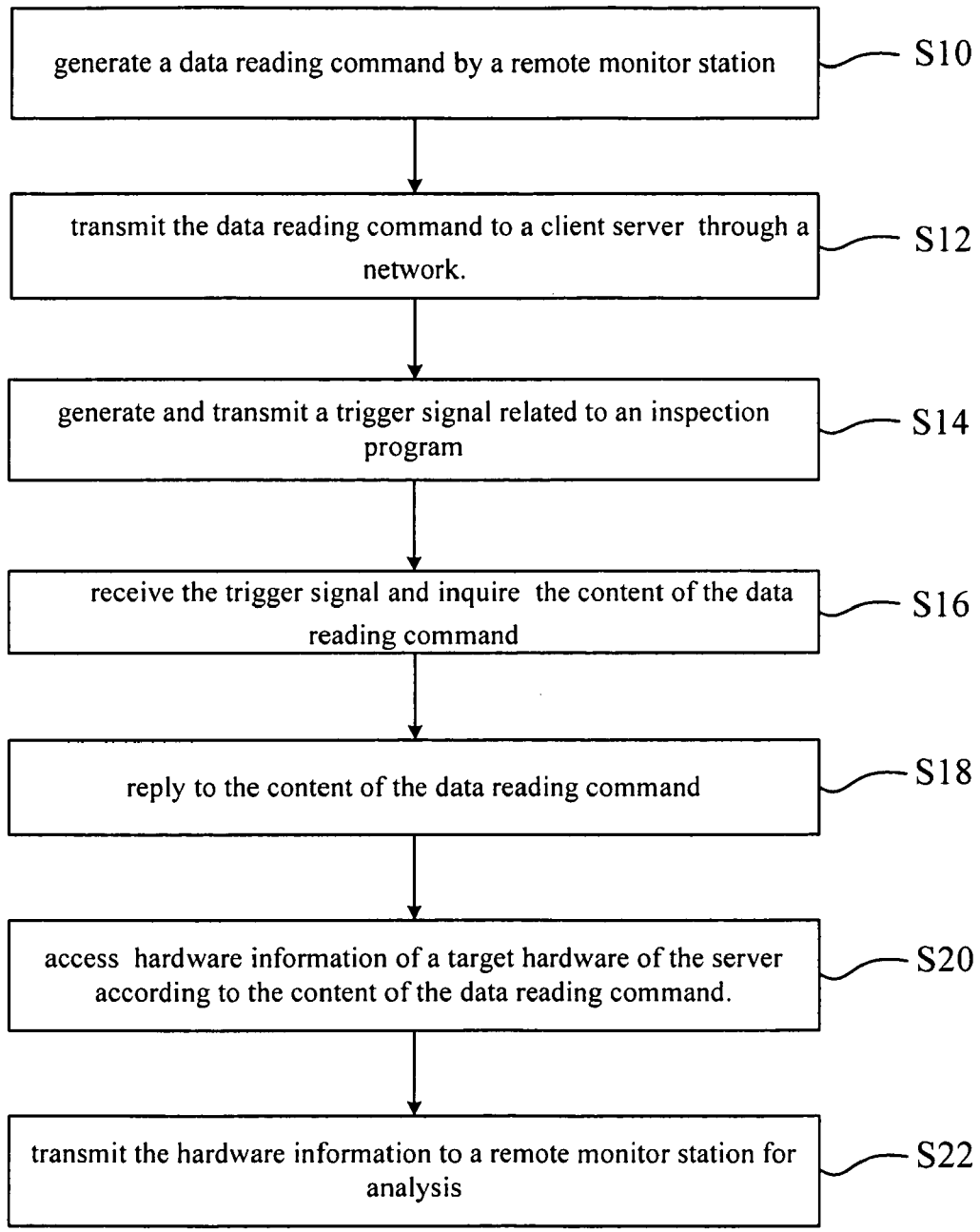
FIG. 3A and FIG. 3B are flow charts of a remote hardware inspection method according one embodiment of the invention.
Figure 3B:
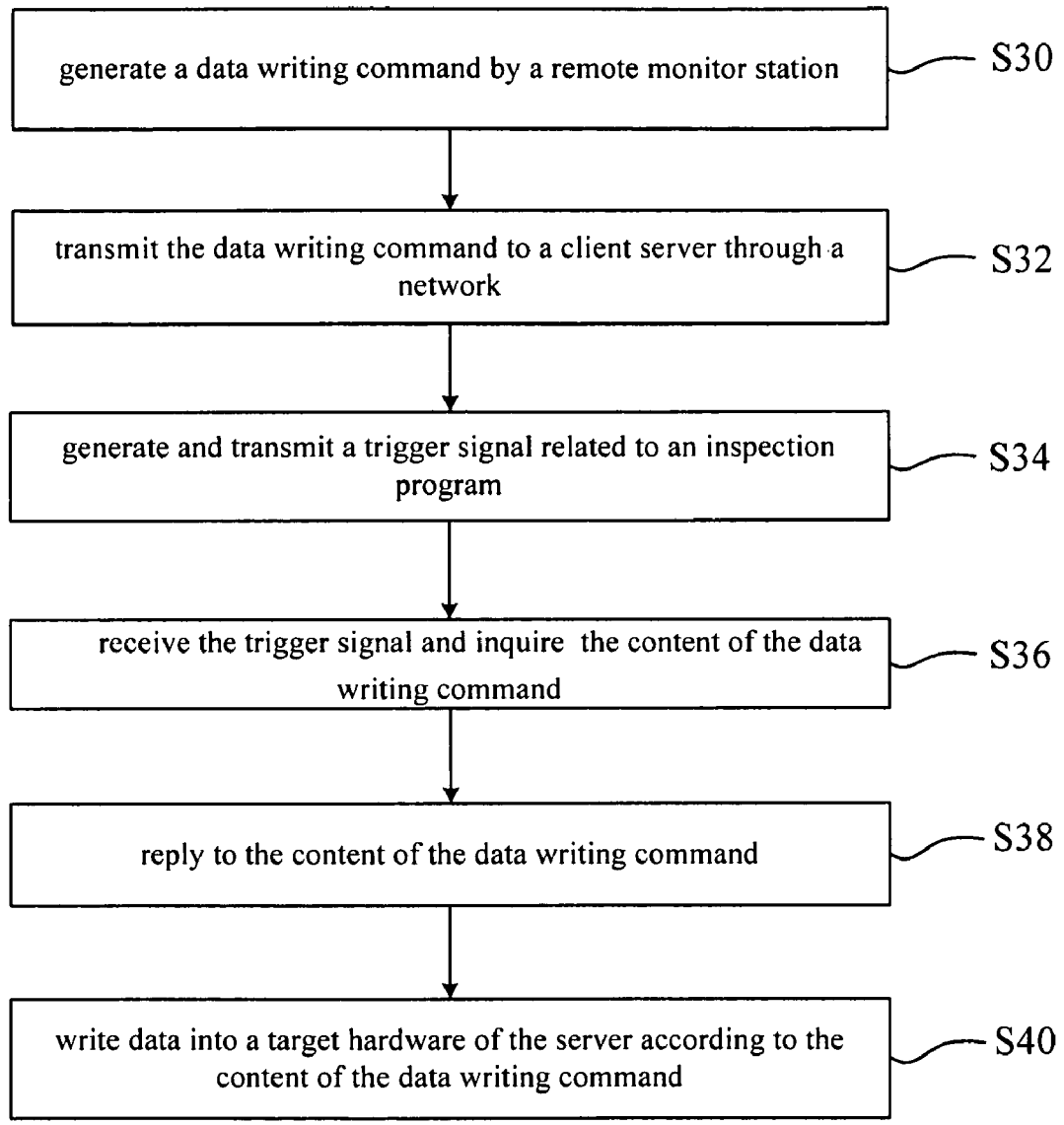

Please refer to FIG. 3A and FIG. 3B. FIG. 3A and FIG. 3B are flow charts of a remote hardware inspection method according to one embodiment of the invention. The inspecting method of the invention is to solve exceptional problems of the client server. For example, the operation system (OS) of the server crashes (e.g. so-called "blue screen of death") or breaks down in the process of staring system. In such situation, the developers or engineers stationing near the remote monitor station can issue a special hardware inspection command. What is remarkable is that the hardware inspection command is a data reading command or a data writing command.

FIG. 3A is a flow chart of an inspecting method of the invention when a hardware inspecting command is a data reading command. Please refer to FIG. 2A and FIG. 2B simultaneously.

First of all, step S10 is performed to generate a data reading command by the remote monitor station 20.

Then step S12 is performed to transmit the data reading command to the client server 22 through a network.

Next, step S14 is performed so that the managing/controlling unit 222 of the client server 22 generates and transmits a trigger signal related to the inspection program 2240. The inspection program 2240 is built in the input/output unit 224 of the client server 22. Additionally, the inspection program 2240 is a SMI service program and the trigger signal is a SMI signal.

Subsequently, step S16 is performed so that the input/output unit 224 receives the trigger signal and inquires the managing/controlling unit 222 about the content of the data reading command.

Afterwards, step S18 is performed so that the managing/controlling unit 222 replies to the content of the data reading command for the input/output unit 224.

After the input/output unit 224 confirms the content of the data reading command, step S20 is performed so that CPU executes the SMI service program of the input/output unit 224 to access the hardware information of the target hardware according to the content of the data reading command.

Later, step S22 is performed so that the input/output unit 224 replies to the hardware information of the target hardware for the managing/controlling unit 222 and then the hardware information is compressed and packaged to be transmitted from the server 22 to the remote monitor station 20 for analysis.

FIG. 3B is a flow chart of an inspecting method of the invention when the hardware inspection command is a data writing command. Please refer to FIG. 2A and FIG. 2B simultaneously.

First of all, step S30 is performed to generate a data writing command by the remote monitor station 20.

Then, step S32 is performed to transmit the data writing command to the client server 22 through a network.

Subsequently, step S34 is performed so that the managing/controlling unit 222 of the client server 22 generates and transmits a SMI signal to start a SMI service program.

Next, step S36 is performed so that the input/output unit 224 receives the SMI signal and inquires of the managing/controlling unit 222 the content of the data writing command.

Afterwards, step S38 is performed so that the managing/controlling unit 222 replies to the content of the data writing command for the input/output unit 224.

After the input/output unit 224 confirms the content of the data writing command, step S40 is performed so that CPU executes the SMI service program of the input/output unit 224 to write data into the target hardware of the server according to the content of the data writing command. By writing data into the target, the operating state of the target hardware can be inspected or the programs can be debugged.

To sum up, when the operation system (OS) of the server crashes (e.g. so-called "blue screen of death") or breaks down in the process of staring system, the developer or engineer can remotely inspect hardware at any time or inspect several client servers at the same time without any external hardware inspection apparatus by using the remote hardware inspection system and method of the invention. In so doing, the development cost of motherboards and the spending time on solving problems can be saved.

Although the present invention has been illustrated and described with reference to the preferred embodiment thereof, it should be understood that it is in no way limited to the details of such embodiment but is capable of numerous modifications within the scope of the appended claims.

What is claimed is:

1. A hardware inspection system, comprising:
a remote monitor station, comprising:
a hardware inspection unit, generating a hardware inspection command; and
a first network interface, connected with the hardware inspection unit, for transmitting the hardware inspection command through a network; and
a client server, comprising:
an input/output unit, comprising an inspection program;
a managing/controlling unit, coupled to the input/output unit; and
a second network interface, coupled to the managing/controlling unit, for receiving the hardware inspection command through the network,
wherein the managing/controlling unit generates and transmits a trigger signal to the input/output unit in response to the hardware inspection command, and the input/output unit executes the inspection program to inspect a target hardware of the client server according to the content of the hardware inspection command.

2. The hardware inspection system of claim 1, wherein the hardware inspection command is a data reading command, the inspection program reads hardware information of the target hardware according to the content of the data reading command, then the hardware information is transmitted from the input/output unit, through the managing/controlling unit, to the second network interface, and the hardware information is transmitted from the second network interface to the remote monitor station, for being determined by the hardware inspection unit.

3. The hardware inspection system of claim 1, wherein the hardware inspection command is a data writing command and the inspection program writes data into the target hardware according to the content of the data writing command.

4. The hardware inspection system of claim 1, wherein the inspection program is a system management interrupt service program, and the trigger signal is a system management interrupt signal.

5. The hardware inspection system of claim 1, wherein the input/output unit and the managing/controlling unit of the client server are communicated with each other via an intelligent platform management interface.

6. The hardware inspection system of claim 1, implementing a remote management control protocol over the network.

7. A method for inspecting a remote hardware comprising the steps of:
(a) generating a hardware inspection command by a remote monitor station;
(b) transmitting the hardware inspection command to a client server through a network;
(c) in response to the hardware inspection command, executing a inspection program of the client server; and
(d) inspecting a target hardware of the client server according to the content of the hardware inspection command.

8. The method of claim 7, wherein the step (c) further comprising the steps of:
(c1) generating and transmitting a trigger signal relative to the inspection program;
(c2) receiving the trigger signal and inquiring the content of the hardware inspection command; and
(c3) replying to the content of the hardware inspection command.

9. The method of claim 8, wherein the inspection program is a system management interrupt service program and the trigger signal is a system management interrupt signal.

10. The method of claim 7, wherein the hardware inspection command is a data reading command and the steps (d) comprises the steps of:
(d1) accessing the hardware information of the target hardware according to the content of the data reading command; and
(d2) transmitting the hardware information from the client server to the remote monitor station for analysis.

11. The method of claim 7, wherein the hardware inspection command is a data writing command and data is written into the target hardware according to the content of the information inputting command in step (d).

12. The method of claim 7, wherein a remote management control protocol is implemented over the network.

* * * * *